United States Patent [19]

Van Wingerden

[11] Patent Number: 5,678,356
[45] Date of Patent: Oct. 21, 1997

[54] APPARATUS FOR GROWING, PLANTING AND TRANSPLANTING PLANTS

[75] Inventor: Aart Van Wingerden, Fletcher, N.C.

[73] Assignee: Winstrip, Inc., Mills River, N.C.

[21] Appl. No.: 610,812

[22] Filed: Mar. 7, 1996

[51] Int. Cl.⁶ ............................................. A01G 9/02
[52] U.S. Cl. ................................... 47/87; 47/73
[58] Field of Search ........................ 47/87, 86, 66, 47/73 R

[56] References Cited

U.S. PATENT DOCUMENTS

| | | |
|---|---|---|
| Re. 32,808 | 12/1988 | Wingerden . |
| 3,035,369 | 5/1962 | Helfert ............................ 47/87 |
| 3,810,329 | 5/1974 | Lecuru ............................ 47/87 |
| 3,949,523 | 4/1976 | Lehtipuu . |
| 4,242,834 | 1/1981 | Olsen . |
| 4,389,814 | 6/1983 | Andreason et al. . |
| 4,510,712 | 4/1985 | Whitcomb . |
| 4,597,222 | 7/1986 | Roode ............................. 47/87 |
| 4,753,037 | 6/1988 | Whitcomb ....................... 47/87 |
| 5,131,185 | 7/1992 | Wingerden . |
| 5,426,890 | 6/1995 | Dümmen .......................... 47/87 |

*Primary Examiner*—Terry Lee Melius
*Assistant Examiner*—Joanne C. Downs

[57] ABSTRACT

There is provided a container or tray for growing, planting and transplanting plant, having a plurality of growing compartments arranged in adjacent rows. Each growing compartment is formed by four walls. An air opening is located adjacent to each wall of each growing compartment. The walls of the growing compartments are offset at a non-right angle with respect to the major axis of the tray. Air slits are formed in the walls of the growing compartments. The bottoms of the growing compartments have openings, each with a pair of ledges adjacent thereto so that the root ball of the plants may be aerated while holding the plants within the growing compartment. The center-to-center spacing between adjacent growing compartments is the same throughout the tray.

18 Claims, 6 Drawing Sheets

APPARATUS FOR GROWING, PLANTING AND TRANSPLANTING PLANTS

BACKGROUND OF THE INVENTION

This invention relates to apparatus for growing, planting and transplanting plants. More particularly, it relates to trays which provide for vertical air flow to the leafy section of the plants, aeration of the root ball and root pruning.

One of the more widely used types of seedling trays now on the market is shown in U.S. Pat. No. 3,667,159 which discloses a plastic tray having a plurality of growing compartments and a small hole at the bottom of each growing compartment so that the water in the soil will drain and the plants may be poked out from the bottom when it is time for planting.

U.S. Pat. No. RE 32,808 issued to Van Wingerden shows a tray which utilizes a plurality of growing compartments and a plurality of air compartments formed by sinuous-shaped partitions which are assembled together to form a complete tray. The compartments which are not used to hold the plants and growing material form air compartments so as to provide air to the leafy sections of the plant. In addition, the Van Wingerden reissue patent teaches the use of a significantly open bottom portion of the growing compartments to increase the amount of root ball aeration. While the Van Wingerden tray described in the reissue patent represents a significant advancement, the specific embodiment described therein showing sinuous strips, however, have several drawbacks. One drawback is that while the sinuous strip design permits a certain amount of mechanization in transplanting, the strips are difficult to handle and manual labor may be required.

U.S. Pat. No. 5,131,185, also issued to Van Wingerden, teaches the use of a plurality of elongated containers, each having a plurality of growing compartments with air compartments located between each growing compartment. The individual containers are joined together by the use of connectors to form a tray. In addition, this Van Wingerden patent discloses a transplanter which requires the disconnection and reconnection of the individual containers during the transplanting operation.

OBJECTS OF THE INVENTION

It is therefore one object of this invention to provide an improved tray for growing, planting and transplanting plants.

It is another object of this invention to provide a tray for containing plants which optimizes the exposure of the plants and soil to air for enhancing growth of the plant and for properly pruning its roots.

It is yet another object of this invention to provide a plant tray or container which enables one to readily mechanize growing, planting and transplanting plants.

SUMMARY OF THE INVENTION

In accordance with one form of this invention, there is provided a tray for growing plants, including a plurality of growing compartments arranged in adjacent rows. The growing compartments contain growing material and plants. Four air openings are located adjacent to a majority of the growing compartments. Each growing compartment includes four side walls. The majority of the growing compartments have four other growing compartments contiguous therewith. A first portion of each side wall of a growing compartment is also a portion of a side wall of a contiguous growing compartment. A second portion of each side wall of a growing compartment is contiguous with an air opening. Preferably, the air openings are in the form of air compartments. Also, it is preferred that two of the parallel walls of each of the growing compartments are offset with respect to the major axis of the tray at an angle other than 90°. In addition, it is preferred that the distances from the geometric center of a growing compartment to the geometric centers of each of its four contiguous growing compartments are substantially equal.

In another form of this invention, there is provided an apparatus for growing, planting and transplanting plants, including at least first and second rectangular-shaped trays. Each tray includes a plurality of adjacent rows of growing compartments and a plurality of rows of air compartments. Each tray has a bordering member on at least two sides. Each bordering member has a predetermined thickness. The tops of each growing compartment which are not adjacent to the bordering members are rectangular in shape. Preferably, the rows of the air compartments adjacent to the bordering members are triangular in shape. When the bordering member of a first tray aligns with and contacts the bordering member of the second tray, the thicknesses of the bordering members are such that two adjacent triangular-shaped air compartments form a rectangular shape having an area which is substantially the same as the area of the rectangle formed by the tops of the air compartments which are not adjacent to the bordering members.

It is preferred that the center-to-center distances between the growing compartments, which are not adjacent to a bordering member, and each of its four adjacent growing compartments are substantially equal. Also, it is preferred that the center-to-center distances between a growing compartment which is adjacent to a bordering member and each of its four adjacent growing compartments, including adjacent growing compartments in the adjacent tray, are substantially equal.

In yet another form of this invention, there is provided a tray for growing plants, including a plurality of growing compartments arranged in adjacent rows. Each growing compartment includes four side walls. The side walls include first and second parallel walls and third and fourth parallel walls. Each growing compartment is tapered from top to bottom so that the area defined by the top of the growing compartment is greater than the area defined by its bottom. At least a first and a second air compartment are adjacent to each of the growing compartments. First and second side openings in each of the growing compartments are formed in the walls below the top of each growing compartment. The first side opening provides an air path between the growing compartment and the first air compartment. The second side opening provides an air path between the growing compartment and the second air compartment. It is preferred that the first side opening is in the form of a first slit located at the intersection of the first and third side walls and a second side opening is in the form of a second slit located at the intersection of the second and fourth side walls.

The tray described above may be readily stacked and nested for transport and storage.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENT

Figure 6:
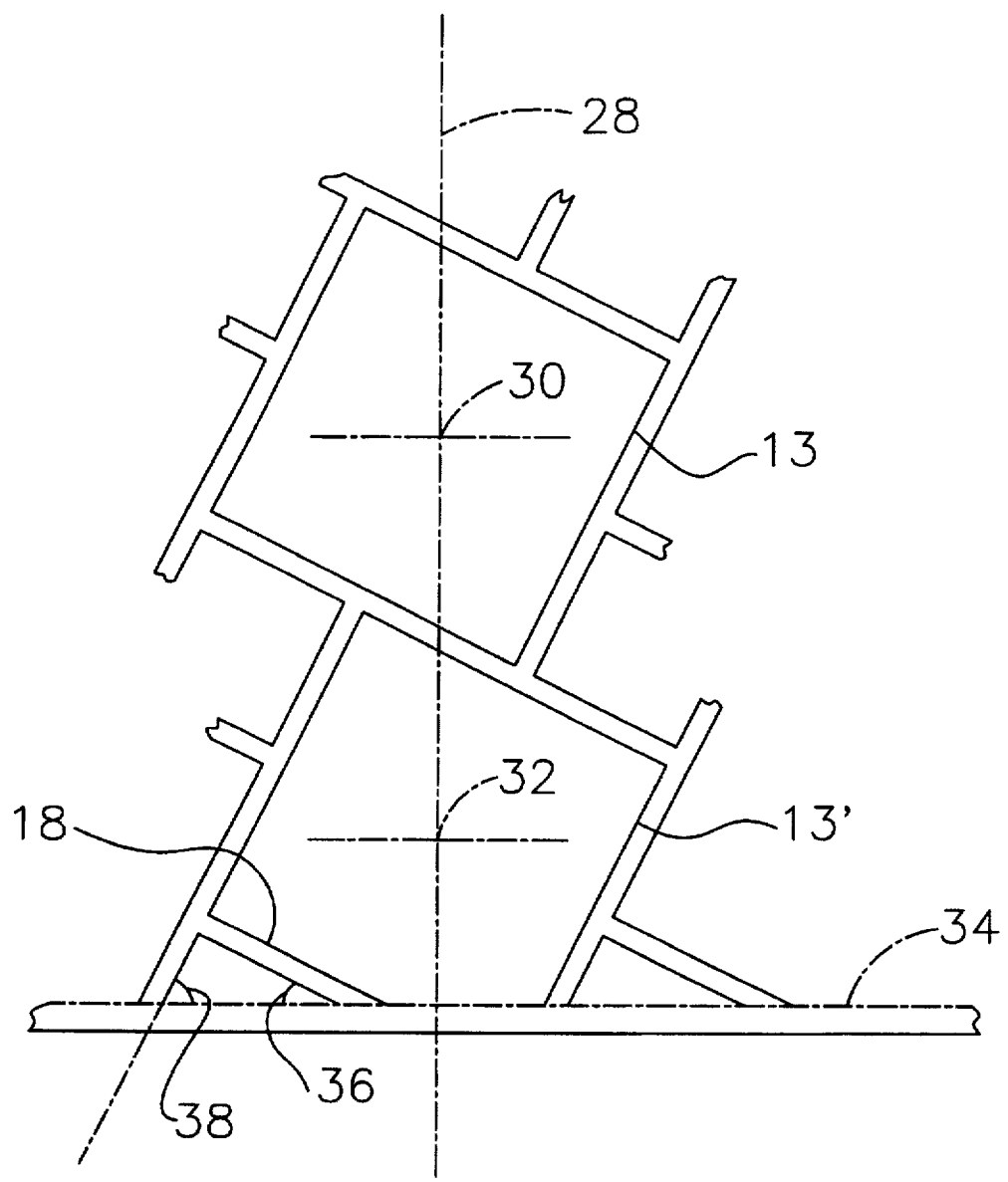
FIG. 6 illustrates a portion of the tray shown in FIG. 2.
Figure 7:
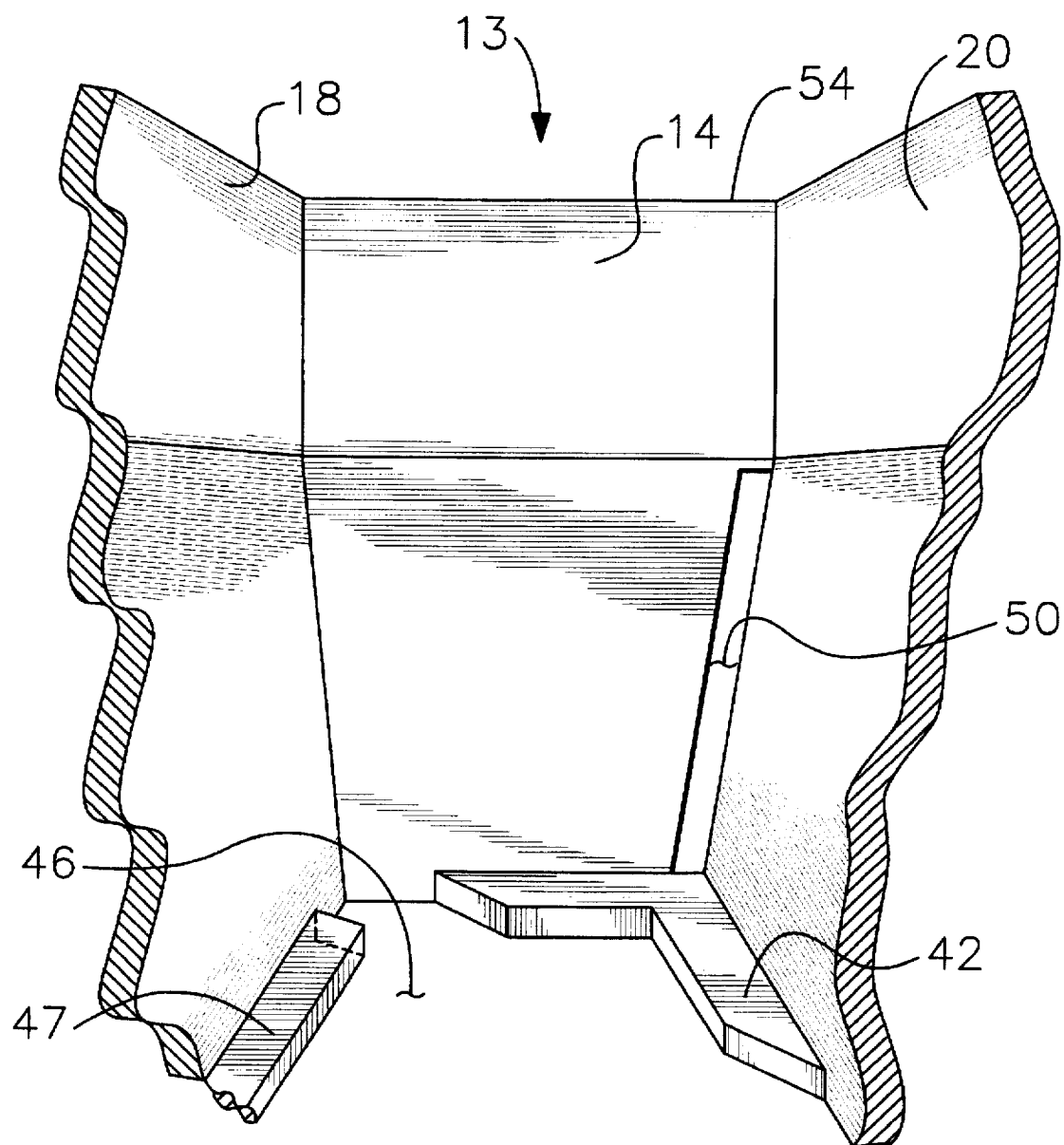
FIG. 7 is a partial pictorial view showing one of the growing compartments of the tray of FIG. 1.

Referring now more particularly to FIGS. 1 through 8, there is provided tray 10 having a plurality of rows 12 of growing compartments 13. Each growing compartment 13 includes four tapered side walls, namely walls 14, 16, 18 and 20. The tray also includes a plurality of rows 22 of air compartments 24. Each growing compartment 13 is surrounded by four of the air compartments. The tray includes bordering member 26 which forms a frame surrounding the tray. Except for the growing compartments which are immediately adjacent to bordering member 26, a portion of each wall of a growing compartment forms a common wall with an adjacent growing compartment. Another portion of each wall of a growing compartment forms a common wall with an air compartment. The orientation of the growing compartments 13 are offset with respect to bordering member 26 and thus with the major axis of tray 10, that is, walls 18 and 20 of each growing compartment 13 are at an angle other than 90° with respect to the major axis of the tray 10. The major axis of the tray is illustrated in FIG. 6 by dotted line 28.

Dotted line 28 passes through the centers 30 and 32 of adjacent growing compartments 13 and 13'. Dotted line 34 is at a right angle with respect to the major axis 28 of tray 10. Angles 36 and 38 represent the amount of offset of the walls 18 and 20 with respect to the major axis of the tray. The size of the angle of offset will determine the size of the air compartments 24 and thus the amount of air going to the leafy section of the plants. It is preferred that angle 36 be greater than 15°, but less than 45°. Air compartments 24 are largest when angle 36 is 45°. The optimal angle of offset depends on the specific crop, i.e., for vegetables it is believed that the optimal angle is 30°. This angle of offset is important in establishing the size and location of air compartments 24 with respect to each growing compartment 13 and determine the ratio of airflow versus growing media surface.

By regulating the size of the offset angle 36, the size of the four air channels 24 surrounding each growing compartment 13 is regulated thereby permitting the air flow around each plant to be carefully measured so that there is a right amount of air flowing to the top leafy section of the plants and to the growing media within each growing compartment. This allows a gentle air flow which helps the seeds to germinate and to be exposed to the right air mixture needed to create a good environment around the germinating seed and the young plant and to maintain the correct micro climate under the leaf cover after the plants have grown a full leaf cover. The micro climate around the seedling is influenced by the amount of air directed to flow through the calculated opening in each air component.

Each growing compartment includes bottom opening 40 which provides for root ball aeration, as well as provides a means for permitting the plants to be released from the tray. Ledges 42 and 44 are located at the bottom of each air compartment. The ledges are structured such that the root ball, and thus the plant, will not readily slip through opening 40. In addition, the fact that the walls of each growing compartment are tapered will also aid in preventing the plant from slipping through opening 40. A pair of gaps 46 and 48 are provided between adjacent ledges 42 and 44. These gaps, along with bottom 40, provide for air pruning the roots, that is, as the root grows and meets gaps 46 and 48, as well as open bottom 40, the roots will stop growing in that direction, thereby preventing the roots growing in a circular direction. In addition, gaps 46 and 48 provide for additional root ball aeration along with open bottom 40. It is a proven fact that air and gases in the plug mix need to be able to move freely through the growing media. Also, drying of the plant plug mix is very important. Aeration of the root ball removes gases that are otherwise trapped.

The roots need oxygen and they need to dispose of carbon dioxide. In order to further facilitate this, air slots 50 and 52 are provided inside of each growing compartment below the top lips 54 of the walls of the growing compartment. Preferably, air slot 50 is located in the corner between walls 14 and 20 while air slot 52 is located in the corner between walls 16 and 18. The vertical air slots provide for additional root ball aeration. In addition, the air slots 50 and 52 also provide air pruning of the roots, again, preventing the roots from growing in a spiral direction which causes problems when transplanting the plants. Air pruning causes the roots to stop growing in the spiral direction, thereby enabling fibrous roots to spring therefrom.

Figure 1:
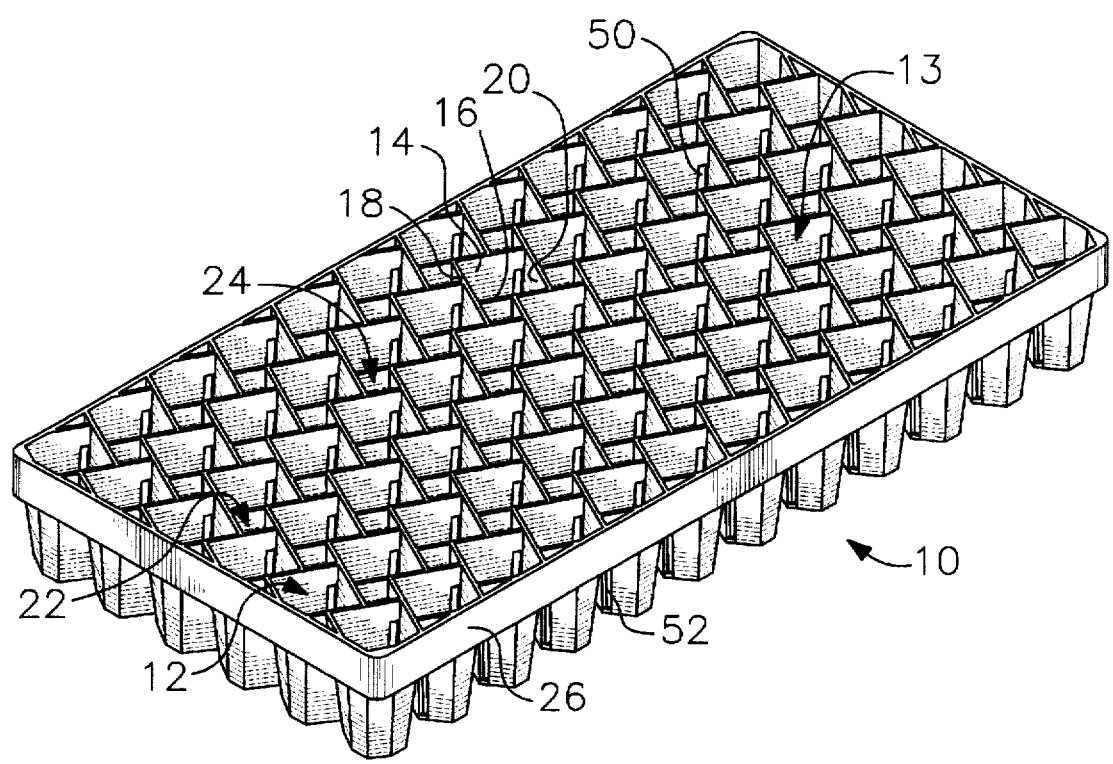
FIG. 1 is a pictorial view of a tray of the subject invention.
Figure 2:
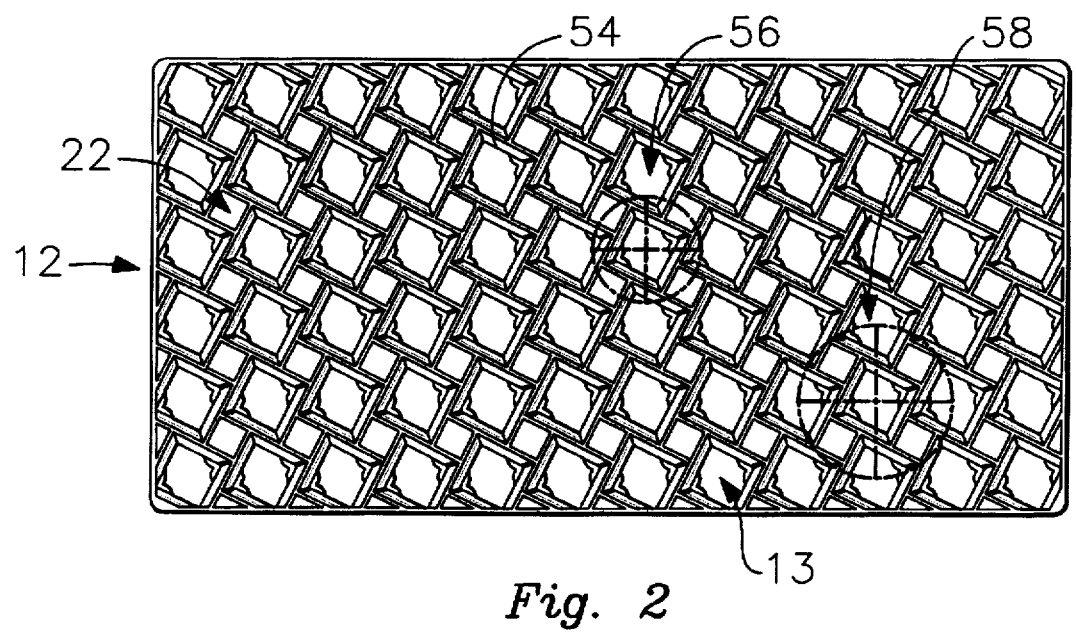
FIG. 2 is a top plan view of the tray of FIG. 1.
Figure 3:
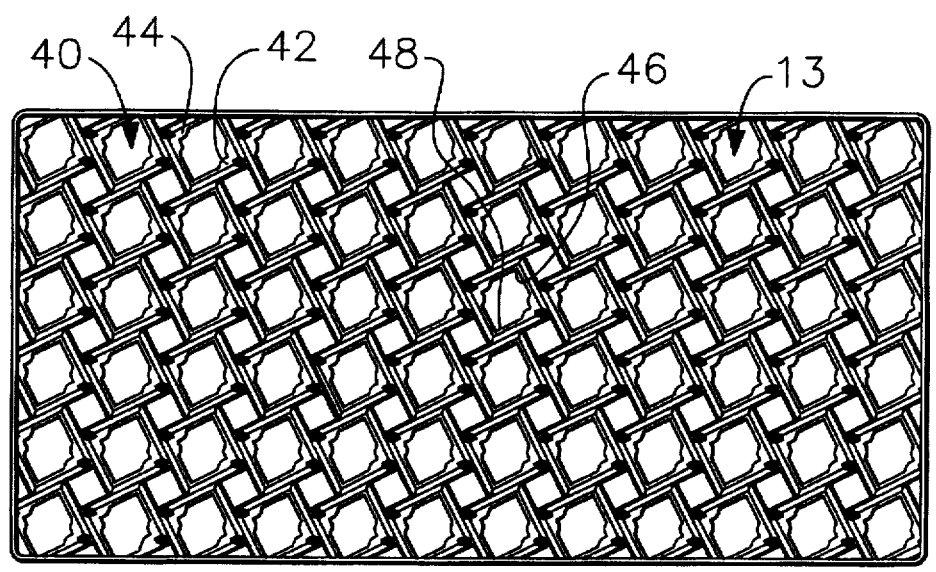
FIG. 3 is a bottom plan view of the tray of FIG. 1.
Figure 4:
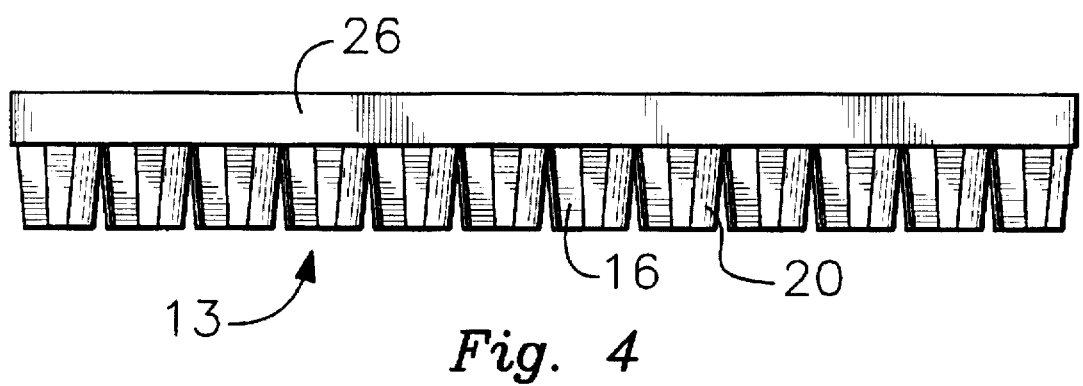
FIG. 4 is a side elevational view of the tray of FIG. 1 showing the long side of the tray.
Figure 5:
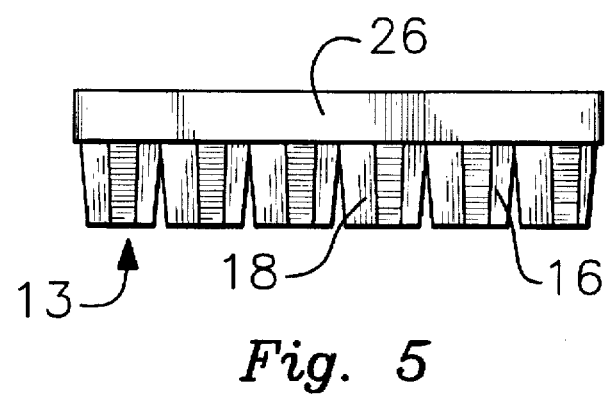
FIG. 5 is a side elevational view of the tray of FIG. 1 showing the short side of the tray.

As illustrated by circle 56 connecting the four radii shown by one of the dotted illustration in FIG. 2, the distance from the geometric center of a growing compartment to the centers of its four adjacent air compartments are equal. In addition, as shown by dotted line illustration 58 in FIG. 2, the distance between the geometric center of a growing compartment to the centers of its four adjacent contiguous growing compartments are also equal.

Figure 8:
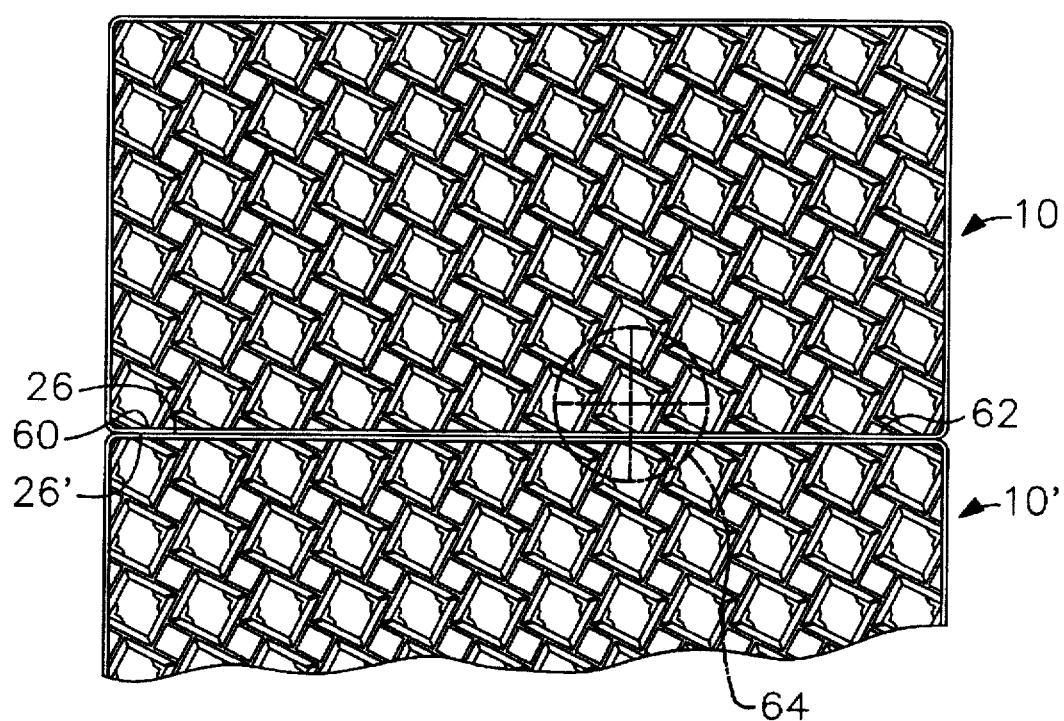
FIG. 8 is a top plan view showing two of the trays of FIG. 1 immediately adjacent to one another.

Referring now more particularly to FIG. 8, as can be seen, a pair of trays 10 and 10' may be readily placed against one another without changing the overall geometric configuration of the combination of trays 10 and 10'. This feature is important in providing a so-called continuous flat so that automated machinery may readily be used in planting, growing and transplanting. That is, the automated machinery, such as a planter or transplanter, will not be hindered by a discontinuity or boundary between adjacent trays. This is accomplished by eliminating the right angle from the corners 60 of the growing compartments which are immediately adjacent to bordering members 26. In addition, the air compartments 62 adjacent to bordering members 26 are each in the shape of a triangle. As shown by the dotted illustration 64, the thicknesses of bordering members 26 and 26' are such that the center to center distance from growing compartments in the respective trays 10 and 10' immediately adjacent to bordering members 26 and 26' are equal to the center to center distances from that growing compartment to its adjacent growing compartments within its own tray.

Thus there is provided a tray to enable one to more readily grow, plant and transplant plants whereby substantially the entire tray is utilized to grow the plants and provide the necessary air for the leafy sections of the plant, as well as for aerating the root ball and for air pruning the roots, and is readily automatable.

From the foregoing description of the preferred embodiment of the invention, it will be apparent that many modifications may be made therein. It will be understood, however, that this embodiment of the invention is an exemplification of the invention only and that the invention is not limited thereto. It is to be understood therefore that it is intended in the appended claims to cover all modifications as fall within the true spirit and scope of the invention.

I claim:

1. An apparatus for growing plants comprising:
a plurality of growing compartments arranged in adjacent rows; said growing compartments adapted to contain growing material and plants;
four air openings each having four side walls located adjacent to each of said growing compartments within a central region of said apparatus;
each growing compartment including four side walls;
each of said growing compartments within said central region having four other growing compartments contiguous therewith;
a first portion of each of said side walls of a growing compartment within said central region also being a portion of a side wall of a contiguous growing compartment;
a second portion of each of said side walls of a growing compartment within said central region also being a side wall of an air opening.

2. An apparatus as set forth in claim 1, wherein each growing compartment has a geometric center; the growing compartments of each row form a straight line defined by the connection of said geometric centers of all of the growing compartments in said row; said side walls of said growing compartments in said row not being perpendicular to said straight line.

3. An apparatus as set forth in claim 2, wherein the distances from the geometric centers of a growing compartment within said central region to the geometric centers of each of its four contiguous growing compartments are substantially equal.

4. An apparatus as set forth in claim 2, wherein said four side walls of each growing compartment include first and second parallel walls across from one another and third and fourth parallel walls across from one another; the angle between a line perpendicular to said straight line and said second parallel wall being greater than 15° and less than 45°, whereby the amount of air flowing to the plants and growing material may be regulated.

5. An apparatus as set forth in claim 1, wherein the top of each growing compartment within said central region and the top of each air opening within said central region are each in the shape of a rectangle.

6. An apparatus as set forth in claim 5, wherein said rectangles are squares.

7. An apparatus as set forth in claim 1, further including first and second air slots respectively located in said second portion of two of the side walls of each growing compartment adjacent to an air opening; each growing compartment including a top rim; said air slots being located below the top rim of said growing compartment.

8. An apparatus as set forth in claim 1, further including an opening at the bottom of each of said growing compartments; at least one ledge formed near said opening at the bottom of each of said growing compartments for retaining the soil in each of said growing compartments.

9. An apparatus as set forth in claim 8, wherein said at least one ledge includes a pair of ledges; a pair of gaps located between said pair of ledges; said pair of gaps air pruning the roots of the plant.

10. An apparatus for growing, planting and transplanting plants comprising:
at least first and second rectangular shaped trays;
each tray including a plurality of adjacent rows of growing compartments and a plurality of rows of air compartments;
each tray having a bordering member on at least two sides;
each of said bordering members having a predetermined thickness, the bordering member of said first tray adapted to be placed in contact with the bordering member of said second tray;
the top of each growing compartment having a geometric center;
the center to center distances between a growing compartment which is not adjacent to one of said bordering members and each of its four adjacent growing compartments being substantially equal;
a top opening of each of said growing compartments and each of said air compartments which is not adjacent to one of said bordering members being rectangular in shape; and
the top openings of each of said air compartments which is adjacent to one of said bordering members being triangular in shape, whereby, when said first and second trays are adjacent to one another so that said bordering member of said first tray aligns with and contacts said bordering member of said second tray, the thicknesses of said bordering members are such that two adjacent triangular-shaped top openings of said air compartments adjacent to said bordering members form a rectangular shape having an area which is substantially the same as the area of a rectangle formed by the top opening of said air compartments which are not adjacent to said bordering members.

11. An apparatus as set forth in claim 10, further including an opening at the bottom of each of said growing compartments; at least one ledge formed near said opening at the bottom of each of said growing compartments for retaining the soil in each of said growing compartments.

12. An apparatus as set forth in claim 10, wherein said growing compartments are tapered from the top to the bottom.

13. An apparatus for growing, planting and transplanting plants comprising:
at least first and second rectangular-shaped trays;
each tray including a plurality of adjacent rows of growing compartments and a plurality of rows of air compartments; each growing compartment having four growing compartments adjacent thereto;
each tray having a bordering member on at least two sides;
each of said bordering members having a predetermined thickness, the bordering member of said first tray adapted to be placed in contact with the bordering member of said second tray;
the top of each growing compartment having a geometric center;
the center to center distances between a growing compartment which is not adjacent to one of said bordering members and each of its four adjacent growing compartments being substantially equal;

the center to center distances between each growing compartment which is adjacent to one of said bordering members, and each of its four adjacent growing compartments, including an adjacent growing compartment in the adjacent tray, being substantially equal; and top openings of said growing compartments and said air compartments which are not adjacent to said bordering members being rectangular in shape; said rows of said air compartments adjacent to said bordering members being triangular in shape, whereby, when said first and second trays are adjacent to one another so that said bordering member of said first tray aligns with and contacts said bordering member of said second tray, the thicknesses of said bordering members are such that two adjacent triangular-shaped air compartments form a rectangular shape having an area which is substantially the same as the area of a rectangle formed by the top opening of said air compartments which are not adjacent to said bordering members.

14. An apparatus for growing, planting and transplanting plants comprising:

at least first and second rectangular-shaped trays;

each tray including a plurality of adjacent rows of growing compartments and a plurality of rows of air compartments;

each tray having a bordering member on at least two sides;

each of said bordering members having a predetermined thickness, the bordering member of said first tray adapted to be placed in contact with the bordering member of said second tray;

each growing compartment and air compartment having a top opening; said top opening of each growing compartment having a geometric center;

the center to center distances between the top opening of a growing compartment which is not adjacent to one of said bordering members and each of its four adjacent growing compartments being substantially equal;

each of said growing compartments which is not adjacent to one of said bordering members having first and second parallel walls and third and fourth parallel walls;

each of said growing compartments which is adjacent to one of said bordering members having first and second parallel walls and third and fourth parallel walls, and further having a fifth wall, said fifth wall being located between said first and third parallel walls, said fifth wall being a common wall with a portion of said adjacent one of said bordering members;

the top openings of said growing compartments and said air compartments which are not adjacent to said bordering members being rectangular in shape; said rows of said air compartments adjacent to said bordering members being triangular in shape, whereby, when said first and second trays are adjacent to one another so that said bordering member of said first tray aligns with and contacts said bordering member of said second tray, the thicknesses of said bordering members are such that two adjacent triangular-shaped air compartments form a rectangular share having an area which is substantially the same as the area of a rectangle formed by the top opening of said air compartments which are not adjacent to said bordering members; and the center to center distances between a growing compartment which is adjacent to one of said bordering members, and each of its four adjacent growing compartments, including the adjacent tray, are substantially equal.

15. An apparatus as set forth in claim 14, wherein when said first and second trays are in contact and adjacent to one another, said first and second trays form a continuous tray which is geometrically substantially indistinguishable from a single tray, whereby said trays may readily be used for planting, growing and transplanting in a continuous operation.

16. An apparatus as set forth in claim 14, wherein said first tray may be readily stacked upon and nested with said second tray for transport and storage.

17. An apparatus for growing, planting and transplanting plants comprising:

at least first and second rectangular-shaped trays;

each tray including a plurality of adjacent rows of growing compartments and a plurality of rows of air compartments;

each tray having a bordering member on at least two sides;

each of said bordering members having a predetermined thickness, the bordering member of said first tray adapted to be placed in contact with the bordering member of said second tray;

each growing compartment having a top opening; said top opening of each growing compartment having a geometric center;

the center to center distances between the top opening of a growing compartment which is not adjacent to one of said bordering members and the top opening of each of its four adjacent growing compartments being substantially equal;

an opening at the bottom of each growing compartment; and a pair of ledges formed near said opening at the bottom of each growing compartment for retaining the soil in said growing compartments; a pair of gaps located between said pair of ledges; said pair of gaps for air pruning the roots of the plant.

18. A tray for growing plants comprising:

a plurality of growing compartments arranged in adjacent rows;

each growing compartment including four side walls, said four side walls including first and second parallel walls and third and fourth parallel walls, top portions of said four side walls forming an unbroken edge;

each growing compartment having a top opening and a bottom opening;

each growing compartment being tapered from top to bottom so that the area of said top opening of each of said growing compartments is greater than the area of said bottom opening of each of said growing compartments;

at least first and second air compartments adjacent to each of said growing compartments;

a first side opening in each of said growing compartments formed below said top opening of each of said growing compartments, said first side opening providing an air path between each of said growing compartments and said first air compartment;

a second side opening in each of said growing compartments formed below said top opening of each of said growing compartments, said second side opening providing an air path between each of said growing compartments and said second air compartment; and the orientation of each of said growing compartments being offset with respect to the major axis of said tray; said offset being at an angle other than 90°.

* * * * *